Nov. 7, 1950 — L. E. SIMMONS — 2,529,053
PISTON CONSTRUCTION
Filed May 10, 1948

L. E. Simmons
INVENTOR
BY CA Snow & Co.
ATTORNEYS.

Patented Nov. 7, 1950

2,529,053

UNITED STATES PATENT OFFICE 2,529,053

PISTON CONSTRUCTION

Leo E. Simmons, Shreveport, La.

Application May 10, 1948, Serial No. 26,023

1 Claim. (Cl. 309—4)

This invention relates to slush pumps, and more particularly to the construction of the piston thereof, the primary object of the invention being to provide means whereby the piston may be adjusted to compensate for liner wear, thereby appreciably increasing the life of the usual expensive slush pump piston.

Another important object of the invention is to provide a piston wherein the rubber packing rings thereof may be adjusted without the necessity of removing either the piston or piston rod from the pump.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
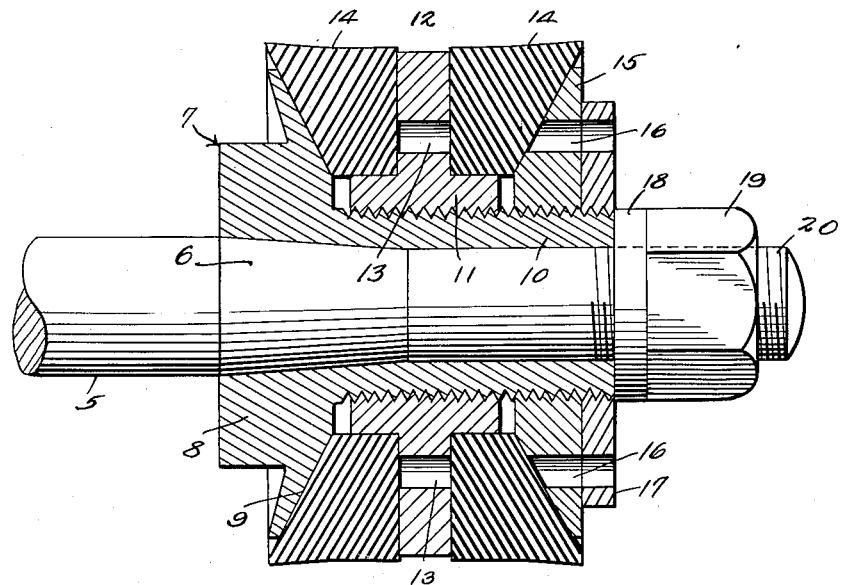
Figure 1 is a longitudinal sectional view through an adjustable piston constructed in accordance with the invention.
Figure 2:
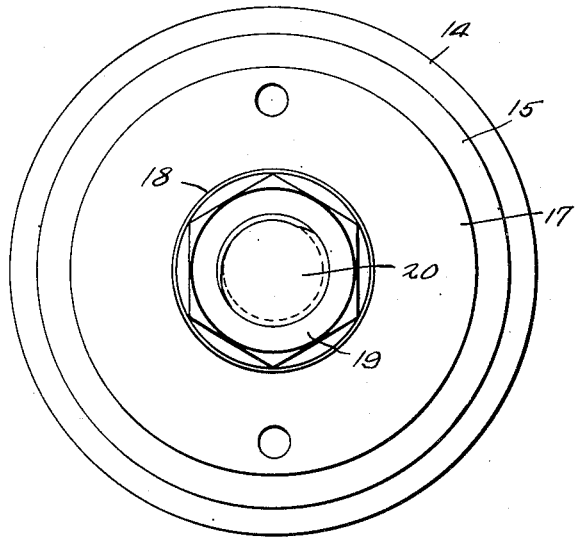
Fig. 2 is an end elevational view thereof.

Referring to the drawing in detail, the reference character 5 indicates the usual pump rod of a slush pump, the pump rod having the usual tapered end 6 on which the piston hub 7 fits, the piston hub being provided with an enlarged end portion 8 formed with the beveled inner surface 9 and a threaded extension 10 of a length to extend throughout the length of the piston.

Mounted on the threaded extension 10 of the piston, is the adjustable center thrust ring 11 which is formed with internal threads that cooperate with the threaded extension 10 in moving the thrust ring longitudinally of the threaded extension 10. The thrust ring 11 is formed with an annular flange 12 formed on the outer surface thereof, and disposed intermediate the ends of the thrust ring, the flange being provided with spanner wrench openings 13 whereby the thrust ring may be readily rotated to move it longitudinally of the threaded extension in making an adjustment.

In the construction of the center thrust ring, the surfaces of the annular flange are disposed at right angles with respect to the outer surface of the ring, providing abrupt shoulders against which the right-angled surfaces of the rubber packing rings 14 engage so that when the rubber packing rings are moved by reason of adjusting the center thrust ring, the packing rings will be subjected to pressure evenly, throughout the entire right-angled surfaces thereof insuring a true seal between the piston and cylinder wall in which it moves.

The reference character 15 indicates the outer adjusting ring which has its inner surface beveled to engage the beveled surface of the rubber packing ring associated therewith. The outer adjusting ring is also threaded on the threaded extension 10 of the piston hub so that by rotating the outer adjusting ring, the outer adjusting ring may be moved longitudinally of the extension 10 adjusting the packing ring. Spanner wrench openings 16 are formed in the outer adjusting ring 15 whereby a spanner wrench may be positioned thereon for accurately rotating the adjusting ring to accomplish the adjustment of the rubber packing rings. The reference character 17 indicates a lock nut which is also threaded on the extension 10 and secures the various elements of the piston in their positions of adjustment.

A further securing means embodies the nut 18 which engages the end of the extension 10, while the nut 19 mounted on the threaded end 20 of the pump rod 5, locks the element 5 of the piston in place.

From the foregoing it will be seen that due to the construction shown and described, I have provided a piston including a center adjustable thrust ring on which the rubber packing rings of the piston are mounted, the beveled surfaces of the rubber packing rings being disposed outwardly so that they cooperate with the beveled surfaces of the piston hub and outer adjusting ring 15.

It is obvious when wear on the rubber packing rings occurs and it is necessary to make the required adjustment, it is only necessary to remove the outer rubber packing ring, outer adjusting ring and nut which holds the piston elements in place. The center thrust ring may now be moved towards the inner packing ring causing the packing ring to expand to closely engage the wall of the pump cylinder. The outer rubber packing ring may now be positioned on the adjustable center thrust ring and the outer adjusting ring operated to compress the outer rubber packing ring, forcing it into contact with the cylinder wall. The nuts may now be removed to hold the adjustment.

By using the piston construction as shown and described, it is obvious that wear which would otherwise render the piston useless may now be compensated for, thereby increasing the life of the piston appreciably.

Having thus described the invention, what is claimed is:

An adjustable slush pump piston, comprising a piston hub adapted to be positioned on a pump rod, the inner surface of the hub being beveled, a threaded extension forming a part of the hub, a thrust ring adjustably mounted on the threaded extension and having right angled surfaces providing packing ring seats, inner and outer packing rings mounted on the packing ring seats, the inner packing ring having a beveled surface contacting with the beveled surface of the hub, said outer packing ring having a beveled surface, an outer adjusting ring mounted on the threaded extension, said adjusting ring having a beveled surface engaging the outer beveled surface of the outer packing ring, said thrust ring and adjusting ring adapted to move the packing rings outwardly adjusting the packing rings, and means for securing the adjusting ring in its positions of adjustment.

LEO E. SIMMONS.

REFERENCES CITED

The following references are of record in the file of this patent:

UNITED STATES PATENTS

| Number | Name | Date |
|---|---|---|
| 1,557,720 | Mueller | Oct. 20, 1925 |
| 2,277,501 | Murray | Mar. 24, 1942 |
| 2,285,863 | Jeffrey et al. | June 9, 1942 |